Figure 1:
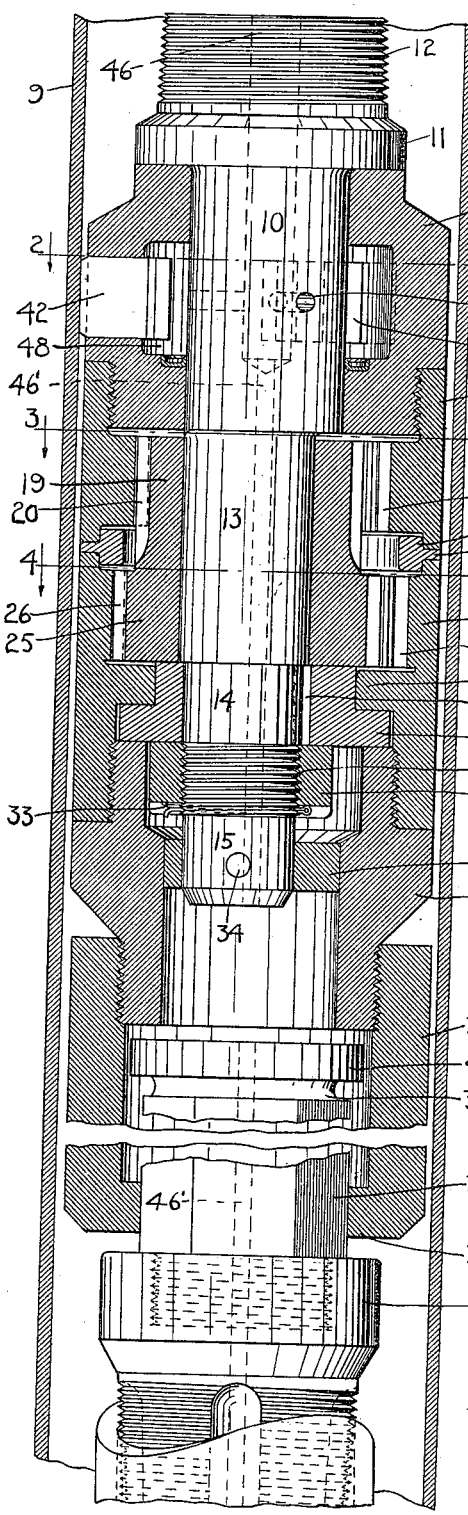

H. W. FLETCHER.
DEVICE FOR UNSCREWING AND WITHDRAWING PIPE.
APPLICATION FILED OCT. 29, 1918.

1,311,385.

Patented July 29, 1919.
2 SHEETS—SHEET 1.

H. W. FLETCHER, Inventor

By His Attorney Jesse R. Stone

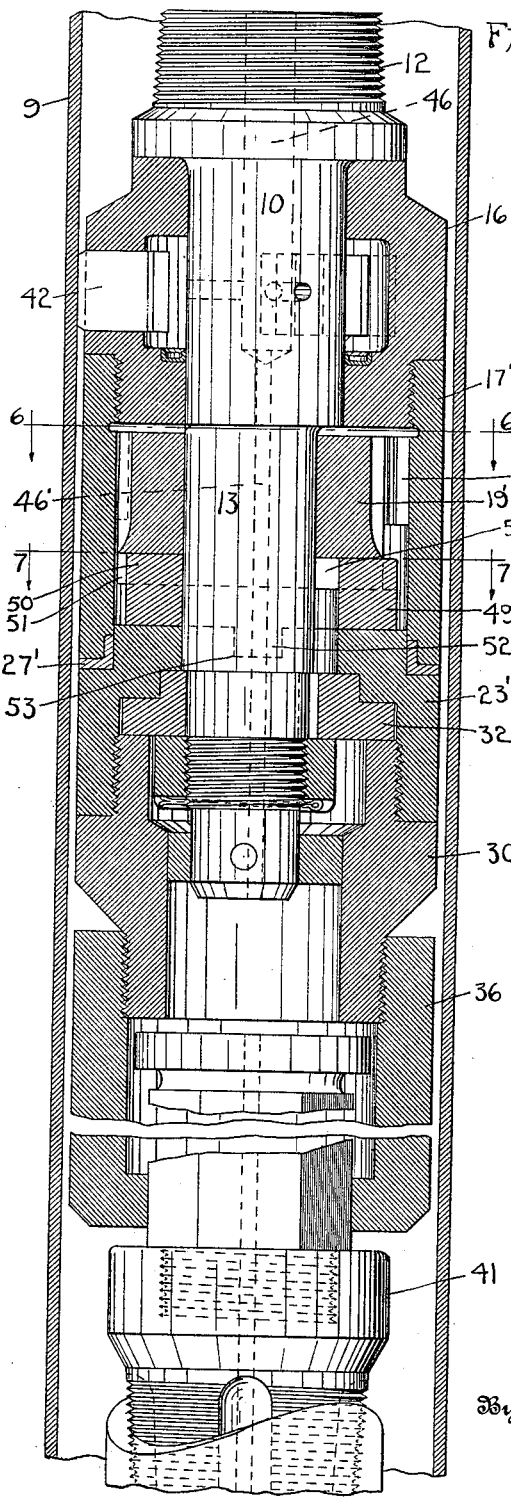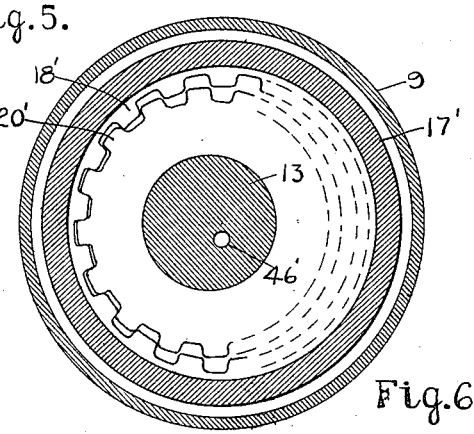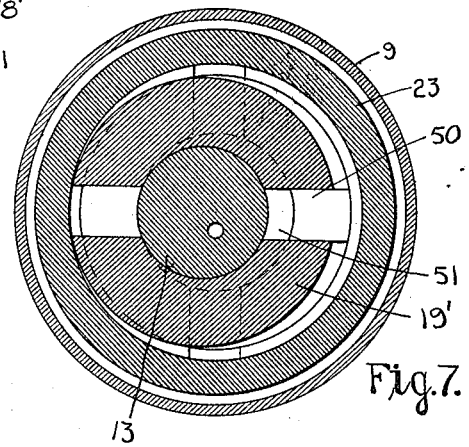

UNITED STATES PATENT OFFICE.

HAROLD W. FLETCHER, OF HOUSTON, TEXAS.

DEVICE FOR UNSCREWING AND WITHDRAWING PIPE.

1,311,385.

Specification of Letters Patent. Patented July 29, 1919.

Application filed October 29, 1918. Serial No. 260,117.

*To all whom it may concern:*

Be it known that I, HAROLD W. FLETCHER, a citizen of the United States, residing at Houston, Harris county, Texas, have invented a certain new and useful Improvement in Devices for Unscrewing and Withdrawing Pipe, of which the following is a full, clear, and exact description, such as will enable others skilled in the art to which it appertains to make and use the same.

My invention relates to an improvement in devices for unscrewing and withdrawing pipe from wells, mines or for other similar uses.

The lengths of pipe used in oil or water wells, mines etc., are almost invariably threaded for connection with the couplings with a "right hand" thread. The rotary which operates the drill stem, or serves to thread the lengths of casing together is adapted to rotate in the same right hand or clockwise direction. When it is desired to unscrew pipe and withdraw it from the well, it is necessary to reverse the direction of rotation so as to give the desired left hand movement to the pipe. Usually the oil or water wells are of substantial depth and if it is desired to withdraw a broken off length of drill stem from the well a tap is lowered down inside the pipe for a certain depth and, when the same is attached to the pipe so as to obtain a grip thereon, the tool is rotated in a left hand or counter-clockwise direction to unscrew a section of the pipe, in order that it may be withdrawn. This procedure is especially adapted for use where the pipe has become sanded up or otherwise lodged in the well so that it becomes impossible to withdraw the whole string of pipe in one operation. As the tap is attached to the end of a piece of drill stem, it is necessary that the lengths of pipe which make up this piece of drill stem should be threaded in a left hand direction in order to prevent the drill stem, used in withdrawing the other pipe, from itself unscrewing and being left in the well. This necessitates keeping on hand a large amount of pipe threaded in a left hand direction which is for use only in this operation.

An object of my invention is to provide a tool which may be attached at the end of a drill stem, threaded in the ordinary right hand direction and which will serve to give the desired left hand motion to the pipe which it is desired to unscrew and withdraw.

Another object is to provide a tool of the character described which shall be of simple and rugged construction, such as is necessary for the heavy operations to which it is adapted, and which will be so inclosed and protected as to prevent excessive wear in the working parts.

Other objects and advantages of my invention will more clearly appear in the description which follows, and will be set forth with more particularity in the claims herewith.

Figure 2:
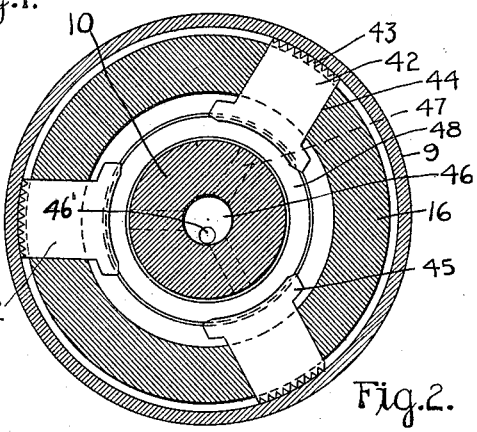
Figure 3:
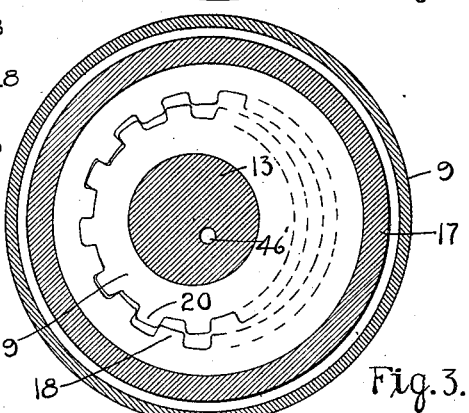
Figure 4:
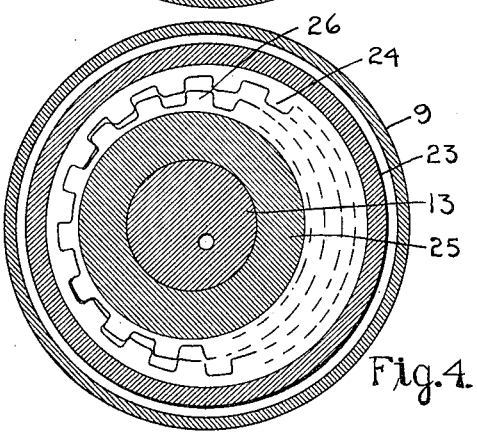

Referring now to the drawings forming a part of this specification and in which like numerals are applied to like parts throughout the several views, Figure 1 is a central longitudinal section through my device, the central shaft thereof being shown in elevation. Fig. 2 is a transverse section on the line 2—2 of Fig. 1. Fig. 3 is a transverse section on the line 3—3 of Fig. 1. Fig. 4 is a similar section on the line 4—4 of Fig. 1. Fig. 5 is a central longitudinal section similar to Fig. 1, illustrating a modified embodiment of my invention. Fig. 6 is a transverse section on the line 6—6 of Fig. 5. Fig. 7 is a similar section on the line 7—7 of Fig. 5.

My tool, as shown in the drawings herewith, includes a central shaft 10, having an upper cylindrical enlarged section 11, and a threaded upper extension 12 for attachment to an ordinary right hand drill stem. The shaft 10 is concentric with the axis of the drill stem for a short distance and is provided with an eccentric extension 13, which is reduced slightly in diameter toward the lower one-half thereof to furnish support for a thrust bearing 32 during the rotation of the shaft. This reduced portion 14, is threaded midway of its length at 21 to accommodate a nut 22, to support the bearing 32, and is still further reduced at the lower end, as at 15, where it furnishes attachment for a radial bearing ring 29.

The section 10 of the shaft is provided with an outer bearing sleeve 16, which is threaded at its lower end to another sleeve 17, of shorter length, said sleeve 17 having inwardly projecting gear teeth 18, within the same. Mounted upon the eccentric portion 13 of the shaft, is a gear 19, which is of small diameter and toothed exteriorly at 20 to mesh on one side, with the teeth 18 of the sleeve 17. A downward extension of the gear 19 is enlarged slightly in diameter to form a larger gear 25 provided with outwardly extending teeth 26. The said teeth 26, are adapted to mesh on one side only with another annular gear 23 of larger interior diameter than the gear 17 and which is provided with inwardly extending teeth 24. Between the two outer gear sleeves 17 and 23, I have provided a bearing ring 27 which fits within a recess in the adjacent ends of these two gear sleeves and has an outwardly extending bearing portion 28. As will be seen from Fig. 1, this ring serves as a bearing to take up wear between the rotating parts and will fit closely between the two gear sleeves, so as to prevent the entrance of grit or sand from the outside of the tool to the inner rotating parts. This bearing may be removed and replaced when worn.

The sleeve 23 having thereon the gear teeth 24 toward its upper end, is extended downwardly for attachment to another lower sleeve, 30 to which it is threaded. This downward extension has an inwardly projecting flange 31, forming a shoulder beneath the gear box formed within the gear sleeve 23, and fitting above the thrust bearing 32 in the manner shown in Fig. 1. The lower end of sleeve 23 is threaded, as previously described, for attachment to the sleeve 30. The inner upper part of the sleeve 30, for a distance equal to the length which is threaded into the sleeve 23, forms a chamber within which the nut 22, attached to the shaft 14 in the manner described, is adapted to rotate. The nut 22 is adapted to be tightened into place upon the shaft as shown at 21, so as to form a lower retaining means for the bearing member 32; said bearing member resting partly upon the nut 22 and partly upon the upper shoulder of the sleeve 30. A cotter pin 33 is placed through a hole in the shaft directly below the nut 22 furnishing a locking means to prevent the unscrewing of said nut. The bearing member 29 on the lower end 15 of the eccentric portion 13 of the shaft 10, is fitted within the sleeve 30 so as to bear at all times against the inner surface thereof. As the portion 15 of the shaft is eccentric and the sleeve 30 is bored concentrically with the shaft 10, the bearing member 29 is set eccentrically upon the portion 15 of the shaft in such a manner that when the shaft rotates with a gyratory motion within the sleeve 30 the bearing 29 will rotate evenly in constant contact with the inner portion of the sleeve 30. The bearing member 29 is retained upon the portion 15 of the shaft by means of a pin 34 which is adapted to pass directly through the said bearing member and the shaft, and is retained in position by contact of the pin with the inner walls of the sleeve 30. The bearing member 32 previously described is fixed upon the portion 14 of the shaft by means of a slidable key 35. This bearing portion will be seen to be also eccentric, as compared with the sleeve 23 within which it rotates, to accommodate the gyratory motion of the shaft at that point in the manner previously described in relation to the bearing member 29.

The sleeve 30 is extended downwardly below the end 15 of the shaft 10 for a short distance, as illustrated in Fig. 1 and is threaded into the upper end of a coupling sleeve 36. The lower end of the sleeve 36 is extended inwardly to form a flange 37, adapted to fit closely about the slidable upper end 38, of a drilling jar 39. The portion 38 of the said jar is polygonal in shape and has an upper outwardly extending flange 40 adapted to prevent the jar from being disconnected from the sleeve 36 in an obvious manner. The drilling jar 39 is attached at its lower end to a tap 41 adapted to grip the pipe which is to be unscrewed.

The upper sleeve 16 of this tool must in operation be held stationary within the well. For this purpose I have provided a clamping means composed of jaws 42, of which I have shown three, toothed on their outer surfaces at 43, in order to obtain a firm and immovable grip upon the outer casing or wall of the well. These jaws project outwardly through openings 44 in the sleeve 16 fitting approximately water tight within the opening. The inner end of each of these jaws is extended laterally at 45 to provide a stop to limit the outward movement thereof. Water is pumped down under high pressure through the central channel 46 from the drill stem through the shaft 10 to a point within the sleeve 16. Lateral ducts 47 lead from the lower end of this channel outwardly to the chamber 48 within the said sleeve. The pressure of this water will be exerted against the inner ends of the jaws which will act as pistons forcing the teeth 43 into gripping contact with the casing 9. A small passage 46' leads from the channel 46 downwardly through the tool to the drill pipe below. When the pump is stopped this passage will allow the water to run off releasing the head of water above and thus the pressure on the jaws.

In the operation of my invention the rotation of the drill stem attached to the upper threaded end 12 of the shaft 10 will rotate the said shaft in a clockwise or right hand direction. The hydraulic pressure upon the jaws 42 will maintain the upper sleeve 16 in stationary position. The sleeve 16 being threaded to the sleeve 17, will hence maintain the gear teeth 18 also stationary. As the portion 13 of the shaft 10 is eccentric relative to the axis of rotation of the shaft it will perform a gyratory movement within the sleeves 17 and 23. This gyratory movement will cause the teeth 20 to mesh with the teeth 18 of the annular gear on one side only at any instant of time. Referring particularly to Fig. 3 it will be seen that the gear 19 will be carried around inside the outer toothed sleeve, once with each rotation of the shaft. As the shaft rotates in a clockwise direction it will be obvious that the gear 19 will be rotated in a contrary direction, thereby setting up a left hand rotation. The lower enlarged part 25 of the gear 19 is of larger diameter than that of the upper part in order to mesh properly with the gear sleeve 23 which is of greater internal diameter than the gear sleeve 17. The contact of the teeth 26 of the gear 25 with the inner teeth 24 of the outer sleeve 23, at one point thereon as shown in Fig. 4 will cause the outer sleeve 23 to rotate in the same direction as the gear 25, but as may be readily seen the speed of rotation of the sleeve 23 will be less than the speed of rotation of the shaft.

The rotation of the sleeve 23 will be communicated to the sleeves 30 and 36 and from them to the upper end 38 of the drilling jar 39. When the pipe to be unscrewed is rotated by the tap 41 attached to the lower end of the jar, it is obvious that the rotation will be in a left hand direction thereby unscrewing the pipe, but as my device is fixed against movement within the casing by means of the jaws 42, no vertical movement of the same is possible. When the tap is first screwed into the pipe to be removed, it must move downwardly several inches in order to thread the tap into the pipe; when the tap is come to a seat and a joint of the pipe below unscrews, the unscrewing will cause the same to move upwardly for a few inches, sufficient to detach the upper length of pipe from the upper fixed end of the pipe below. These axial movements of the tap will be accommodated by the sliding contact of the jar 39 with the lower sleeve 36. When the pipe has been unscrewed the jaws may be released from contact with the casing by merely shutting down the pump and the tool, together with the unscrewed pipe, may be withdrawn from the well.

The embodiment of my device shown in Figs. 5, 6 and 7 is identical with that shown in Figs. 1 to 4 inclusive, with the exception of the planetary gear member 19′ and its connecting parts. With special attention to this particular part of the mechanism it will be observed that the upper sleeve 16 is attached to the lower gear sleeve 17′ having inner teeth 18′ which serve to mesh with the eccentric gear 19′ mounted upon the shaft 13. The rotation of the shaft 10 and the eccentric portion 13 thereof will carry the gear 19′ in a planetary manner about the annular gear 17′ causing the same to rotate in the manner previously described. The rotation of the gear 19′ will be communicated to a connecting ring 49 which serves as coupling means between the gear 19′ and the driven ring 23′. The upper portion of the connecting ring 49 is provided with diametrical keys 50 which fit into slots 51 in the lower portion of the gear 19′ and are adapted to coact in a slidable manner. The coupling ring 49 is provided with downwardly projecting keys 52 for slidable connection with slots 53 in the upper face of the driven sleeve 23′. As will be noted from the drawing the coupling sleeve 49 has an internal diameter somewhat greater than the outer diameter of the shaft at 13. This internal diameter is sufficient to accommodate the lateral play of the shaft relative to the ring 49, necessary to the operation of this device. The driven ring 23′ is made with an internal diameter of the same dimensions as is the ring 49. Between the sleeves 17′ and 23′ I have provided a bearing ring 27′ to accommodate any wear between the moving parts.

In the operation of this embodiment of my invention the rotation of the shaft 10 will produce a gyratory motion of the portion 13 of said shaft within the outer sleeve 17′, thereby carrying the gear 19′ in a planetary orbit about the inner portion of the sleeve 17′. This will cause the gear 19′ to rotate in a left hand direction and this movement will be communicated by means of the slots 51 fitting over the keys 50 to the coupling ring 49. The gyratory movement of the gear 19′ will be partially accommodated by the sliding movement of the slots 51 over the keys 50 of the ring. Motion in a direction at right angles to that just described will be accommodated by the lower keys 52 of the coupling ring 49 within the slots 53 on the upper face of the driven sleeve 23′. As the sleeve 23′ is bored interiorly concentric with the axis of rotation of the shaft 10, this coupling ring 49 will allow a lateral movement in all directions of the gear 19′, which actuates the driven member 23′, in an obvious manner. The rotation of the driven ring 23′ will be communicated to the sleeves 30 and 36 and from thence to the tap 41, in the same manner as has been described relative to the preferred embodiment of my invention.

Having thus described my invention, the objects and advantages of which will be clear without further explanation, what I claim as new and desire to protect by Letters Patent is:

1. In a device of the character described, a bearing and locking sleeve, a rotatable operating shaft therein, an eccentric extension on said shaft, a gear rotatable thereon, a stationary annular gear outside of and meshing with said rotatable gear and means connected with said rotatable gear to communicate the rotation thereof to a pipe-gripping means.

2. In a device of the character described, a sleeve, means for locking the same within a well casing, a shaft rotatable therein, a stationary annular gear on said sleeve, a lower sleeve and means on said shaft and operated by said shaft and said gear to cause the rotation of said lower sleeve in a direction opposite to that of said shaft.

3. In a device of the character described a sleeve, a shaft rotatable therein, a central chamber in said sleeve about said shaft, slidable jaws in the sides of said chamber, and a fluid channel in said shaft connected with said chamber for the purpose described.

4. In combination, a reversing tool comprising a series of outer sleeves, a shaft rotatable therein, clamping jaws on one of said sleeves and hydraulic means to force said jaws outwardly relative to said sleeves.

5. A device for unscrewing pipe, comprising a bearing sleeve, means to hold the same in a fixed position, a power shaft in said sleeve, a driven sleeve, means on said shaft and said bearing sleeve to transmit rotation to said driven sleeve in a direction contrary to that of the shaft, a pipe gripping means and means between the same and said driven sleeve to allow for vertical movement of the pipe.

6. A device for unscrewing pipe comprising a bearing sleeve, means to fix said sleeve in a well, a power shaft in said sleeve, a gear sleeve on said bearing sleeve, a gear on said shaft rotatable eccentrically in said gear sleeve, a driven sleeve rotated by said gear, a pipe gripping means rotated by said driven sleeve and a slidable connection between said driven sleeve and said gripping means.

7. In a device for unscrewing pipe, the combination of a fixed bearing ring, a power shaft mounted at its upper end in said ring, a lower eccentric portion of said shaft, a bearing therefor, a gear on said eccentric portion adapted to rotate in a direction contrary to that of the shaft, a driven sleeve operated by said gear and pipe gripping means connected with said driven sleeve.

8. In a device of the character described, a power shaft, a supporting bearing therefor, a gear on said bearing, an eccentric portion on said shaft, a gear on said eccentric portion meshing with said first named gear to rotate in a direction contrary to that of the shaft, a driven ring, a bearing therefor, and a universal coupling between said gear and said ring.

9. In a device of the character described, a power shaft, an eccentric extension thereon, a stationary outer gear a gear on said extension adapted to coöperate with said stationary gear to rotate in a direction opposite to that of said shaft, a driven sleeve concentric with said power shaft and a universal coupling between said gear and said driven sleeve, said coupling comprising a flat ring having a laterally sliding connection with both gear and sleeve.

In testimony whereof, I hereunto affix my signature this the 16th day of September, 1918.

HAROLD W. FLETCHER.

Copies of this patent may be obtained for five cents each, by addressing the "Commissioner of Patents, Washington, D. C."